(12) United States Patent
El-Shall et al.

(10) Patent No.: US 6,830,696 B1
(45) Date of Patent: Dec. 14, 2004

(54) TREATMENT OF SPENT PULPING LIQUOR WITH LIGNIN SEPARATION TO RECOVER ALKALI PULPING CHEMICALS IN MANUFACTURE OF PAPER PULP

(75) Inventors: Hassan E. El-Shall, Gainesville, FL (US); El-Sayed A. Abdel-Aal, Cairo (EG)

(73) Assignee: University of Florida Research Foundation, Inc., Gainesville, FL (US)

(*) Notice: Subject to any disclaimer, the term of this patent is extended or adjusted under 35 U.S.C. 154(b) by 0 days.

(21) Appl. No.: 10/725,158

(22) Filed: Dec. 1, 2003

(51) Int. Cl.$^7$ ............................................. C02F 1/56
(52) U.S. Cl. .......................... 210/716; 71/42; 162/189; 210/724; 210/725; 210/727; 210/928
(58) Field of Search ................................ 162/189, 191; 71/13, 22, 33, 42; 210/710, 716, 724, 725, 726, 727, 928

(56) References Cited

U.S. PATENT DOCUMENTS

| | | | |
|---|---|---|---|
| 4,724,045 A | 2/1988 | Ackel | 162/29 |
| 4,921,613 A | 5/1990 | Nordberg et al. | 210/651 |
| 5,034,094 A * | 7/1991 | Kurple | 162/16 |
| 5,262,963 A * | 11/1993 | Stana et al. | 700/266 |
| 5,632,857 A | 5/1997 | Larson | 162/5 |
| 5,635,024 A | 6/1997 | Shall | 162/16 |
| 5,824,132 A * | 10/1998 | Kopyleva et al. | 71/43 |
| 6,039,189 A | 3/2000 | Luke | 209/5 |
| 6,096,215 A * | 8/2000 | Fang | 210/610 |
| 6,632,327 B1 | 10/2003 | Shall | 162/29 |

FOREIGN PATENT DOCUMENTS

WO    WO 98/54400    * 12/1998

* cited by examiner

Primary Examiner—Peter A. Hruskoci
(74) Attorney, Agent, or Firm—Akerman Senterfitt

(57) ABSTRACT

A method of treating spent alkaline pulping liquor (black liquor) includes the steps of providing black liquor containing lignin, and acidulating a phosphate containing material, wherein phosphoric acid is generated by the acidulating step. The black liquor is mixed with phosphoric acid from the acidulated phosphate containing material, wherein lignin is separated and clarified liquor results. The method can include the step of adding a water soluble, surface active, polymeric, coagulant agent to the black liquor before mixing with the phosphoric acid from the phosphate containing material. The clarified liquor comprises anion species including phosphate.

14 Claims, 1 Drawing Sheet

US 6,830,696 B1

TREATMENT OF SPENT PULPING LIQUOR WITH LIGNIN SEPARATION TO RECOVER ALKALI PULPING CHEMICALS IN MANUFACTURE OF PAPER PULP

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

This invention relates to the field of paper production, more specifically in the treatment of spent digestion liquor resulting from the production of paper pulp.

BACKGROUND

Paper manufacture requires a source of cellulose fibers. Common raw materials as cellulose fiber sources are hardwoods and softwoods as well as those of annual vegetable origin, such as wheat and rice straw, bagasse (sugar cane stalks after processing), hemp, and jute. Rag materials, as well as recycled fibers, can also be used. However, wood has been, and continues to be, a primary source of cellulose fibers for paper production.

Before use, the wood or other cellulose containing raw material must be processed to release the cellulose fibers. This operation is referred to as "pulping". At present, commercial pulping operations are of three principal types: mechanical, full chemical, and semichemical. The processes with which the invention is concerned are full chemical and semichemical pulping based on alkali, typically soda, breakdown of the fiber source. Another method of pulping, known as sulfite pulping, involves chemical transformation of the lignin component of the fiber source resulting in chemically modified lignin to be solubilized in water. Sulfite pulping is generally excluded from the inventive process to be described herein.

Full chemical and semichemical pulping employ chemical reagents to effect separation of the cellulosic fibers from other components. Wood chips or other raw materials are cooked with suitable chemicals in aqueous solution, usually at elevated temperatures and pressures. The object is to dissolve the organic binders holding the cellulosic fibers, termed "lignins", which comprise up to 26% of raw wood, for example, along with other types of organic molecules, such as saccharide molecules, and other extraneous compounds, leaving the cellulose fibers intact. Although there is generally some resulting cellulose degradation, the objective can be realized to a commercially satisfactory degree through the use of a variety of chemical reagents. Pulp yields from wood using such processes are usually about 50% of the wood weight.

Lignins have been studied extensively and are believed to consist of the noncarbohydrate portion of the cell walls of plant materials. Originally, the lignin content of plant materials was defined as the residue after hydrolysis with strong acid following removal of waxes, tannins, and other extractives, including resins and tall oils. Lignins are amorphous, have high molecular weight, and are predominantly aromatic in structure. In general, the monomeric units comprising lignins can be referred to as p-hydrocycinnamyl alcohols. More specifically, according to The Merck Index, lignins comprise coniferyl, p-coumouryl, and sinapyl alcohols. Their precise composition vary with several factors including the method of isolation, and the species, age, and growing conditions, of the plant. Lignins are more or less completely removed from fiber by the digestion process of chemical pulping and enter the water phase of digestion liquor in oxidized colloidal form.

Digestion liquors obtained from alkaline pulping usually contain not only all the lignins in the source material, but substantial amounts of cellulose or carbohydrate monomers, and other carbohydrates. When using annual plant materials as a cellulose source, such as rice and wheat straw, a significant percent by weight of the material is silica. Such used or spent digestion liquors, normally waste, pose problems that are unique in alkaline pulping operations. Waste liquor streams from other operations during the paper making process pose different problems, such as removal of the resins and tall oils found in gymnosperm trees.

The lignin solids precipitate when the spent alkaline digestion liquid is acidified. This process poses a particular problem, because the lignin solids are polymerized by acidification to produce an amorphous gum.

Soda and sulfate pulping are both known in the art as being alkaline pulping processes. The soda process employs caustic soda (sodium hydroxide), whereas the sulfate process employs sodium sulfide in addition to caustic soda. The sodium sulfide used in the sulfate process results in a stronger cooking liquor and accounts for stronger pulp and faster cooking in the sulfate process as compared with soda pulping. The term "kraft pulping" is an alternative to the term sulfate pulping. For the purposes of this invention, there is no practical difference between the lignin-laden, spent liquors that result from either the sulfate or the soda process or from semichemical or other pulping processes which make use of alkaline agents in conjunction with mechanical means to make pulp, except there is often a relatively great amount of silica in soda process digestion liquor as compared with sulfate (kraft) process digestion liquor. The common link between pulp-making processes with which the invention is concerned is that spent digestion liquors employing alkali, whether buffered or not, become laden with solids and with organic matter, usually referenced to as total organic carbon [TOC], primarily lignins, and that both the inorganic and organic constituents must be recovered or otherwise processed to accommodate environmental concerns as well as to recycle inorganic digestive chemicals. All cooking or pulping reagents employing alkali chemicals, especially caustic soda and sodium sulfide, are expensive. Moreover, the inorganic waste materials are usually too toxic to release the spent liquor to the environment.

The sulfate, (e.g. kraft process) and the semikraft process are generally used when wood is the raw material. The active pulping ingredients, sodium hydroxide and sodium sulfide, make up a strongly alkaline solution. Standard in the kraft pulping process is the provision of a liquor-recovery cycle in which the organic constituents in the spent digestion liquor (primarily residual lignins and carbohydrates) are burned for steam generation and for recovery of the inorganic, alkaline, pulping chemicals in molten form, they being then solubilized by the addition of water to form so-called "green" liquor, which is further processed for reuse.

The traditional waste digestion liquor recovery cycle applied most frequently to kraft or semikraft process digestion liquors comprises the step of evaporating digestion waste liquor, the so-called "black liquor", to a high concentration, to so-called "concentrated black liquor" or "black kraft liquor", which is usually (up to) 70% solids, or greater, by weight. Organic sulfur compounds are found in the black liquor from the sulfate process in association with sodium sulfide (NaS). Sodium carbonate ($Na_2CO_2$), sodium sulfate ($Na_2SO4$), and silica ($SiO_2$) are also present. Total solids are usually about 15 percent by weight in black liquor after separation from fiber pulp following digestion.

The term "black liquor" is often also applied to other lignin-laden, used or spent digestion liquors, the compositions of which vary with the reagent chemicals used, the raw material, and the particular mill concerned.

The soda process is normally applied to raw materials of annual vegetable origin, such as cereal (e.g. wheat and rice, straw). Such materials normally contain a relatively high percentage of silica, which is solubilized in the digestion liquor. This poses additional separation problems, because, as well known in the art, separating out silica by acidification of the alkaline spent digestion liquor produces a gelatinous or gummy mass that cannot be separated from the liquor in a practical manner. The elevated silica content of liquor derived by pulping such vegetable fiber sources, as much as one percent by weight, as compared to the relatively low silica content from wood fiber sources, generally precludes practical application of separation and recovery methods presently known to those skilled in the art.

In the usual kraft recovery process in which silica is a negligible factor, after the black liquor is evaporated to about 70% by weight solids, other procedures, such as vacuum flashing, may be performed to increase even more the preparation of solids for burning. The high-solids-content, kraft black liquor is fed into a reducing recovery furnace provided as part of the usual kraft pulping plant for chemical and energy recovery. The usual reducing recovery furnace requires a large capital investment, and its capacity frequently limits production from a typical kraft pulping plant.

Some alternatives to furnace recovery have been disclosed. U.S. Pat. No. 3,546,200 to David M. Whalen et al disclose a simple method for precipitating lignin from kraft black liquor. In the disclosed method, kraft black liquor is added slowly and with stirring to a mixture of an organic liquid, such as chloroform, and enough mineral acid to bring the final pH to about 3. Large amounts of organic liquid required by the disclosed process make the process impractical on a commercial scale.

U.S. Pat. No. 6,632,327 to El-Shall discloses mixing a water soluble, surface active, polymeric agent with digestion liquor, preferably with an additional surface active defoamer coagulant agent prior to or during acidification of the alkaline digestive liquor. This results in an easily separable, non-gelatinous, non-gummy, coagulated lignin as a solid, particulate faction that tends to float on a clarified liquid fraction containing recoverable salts. The solids faction and the liquid frictions are easily separated, one from the other, such as by a gravity separation step. U.S. Pat. No. 6,632,327 to El-Shall is incorporated by reference into the present application in its entirety.

Although U.S. Pat. No. 6,632,327 to El-Shall represents a major advance in treatment of spent alkaline digestion liquor from paper pulping operations, a more efficient and economical way of recovering alkaline pumping chemicals is still needed.

SUMMARY OF INVENTION

A method of treating spent alkaline pulping liquor (black liquor) includes the steps of providing black liquor having lignin, and acidulating a phosphate containing material, wherein phosphoric acid is generated by acid treatment of the phosphate containing material. The black liquor is then mixed with phosphoric acid from the acidulated phosphate containing material to cause separation of lignin from the black liquor, wherein clarified liquor comprising anion species including phosphate is produced.

The phosphate containing material can comprise phosphate comprising rock, wherein the acidulating step comprises contacting the phosphate comprising rock with a sulfuric acid solution to form an acidulated phosphate rock slurry. The amount of said sulfuric acid solution used in the acidulation step is preferably less than the amount necessary for complete conversion of the phosphate rock or other phosphate containing material to phosphoric acid so that there is no measurable sulfate ion concentration remaining in the clarified liquor. By acidulating with a quantity of sulfuric acid less than the stoichometric amount, it is assured that sulfate will be consumed by the excess of phosphate in the rock, and thus no measurable sodium sulfate will be present in the clarified liquor. This condition is generally preferred because recovery of sodium hydroxide from sodium sulfate is not possible using currently available cost effective methods.

In a preferred embodiment of the invention, the method includes the step of adding a water soluble, surface active, polymeric, coagulant agent to the black liquor. The polymer addition is generally most effective when applied to the black liquor prior to mixing with the acid. A surface active agent coactive with the polymeric, coagulant agent, can also be added to the black liquor prior to the mixing step. The method can include the step of separating (e.g. filtering) the acidulated phosphate containing material to form a solid-free liquid phase comprising phosphoric acid, then using the phosphoric acid produced in the mixing step.

The method preferably includes the step of causticizing the clarified liquor using a material comprising calcium oxide. The causticizing step produces calcium phosphate precipitates, such as calcium monophosphate, calcium monophosphate being an agricultural fertilizer.

The black liquor can be obtained from a kraft process pulping plant or a soda process pulping plant. Thus, the invention provides black liquor treatment using low cost acid (e.g. sulfuric acid) and low grade phosphate containing material (e.g. rock) to, achieve the equivalent pulping chemical recovery that could only be heretofore achieved using high cost phosphoric acid.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

Figure 1:
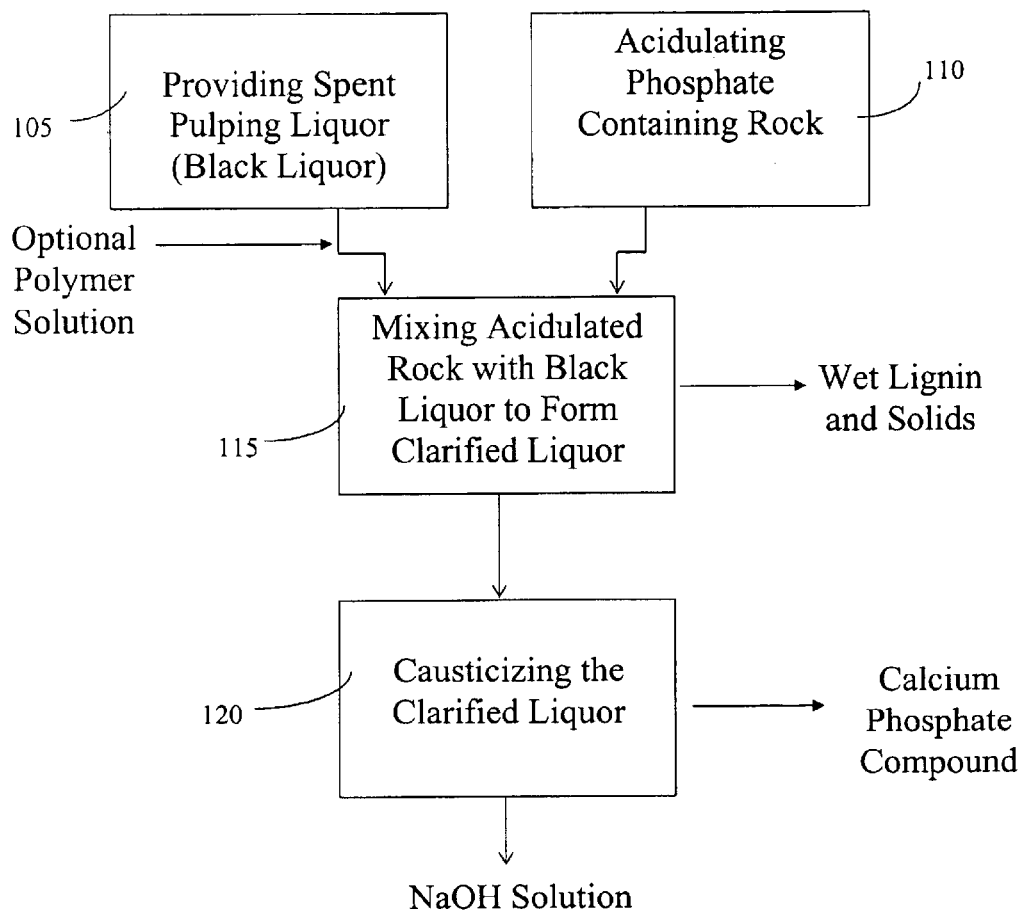
FIG. 1 is a flow chart showing steps employed in performing the basic method of the invention.

The invention provides an improved and highly cost-effective method for treating alkaline digestion "black" liquor derived from paper pulping operations. Referring to FIG. 1, the method 100 includes the step (105) of providing alkaline spent pulping liquor including lignin, typically generated by a paper mill during paper processing. Step 110 comprises acidulating a phosphate containing material, wherein phosphoric acid is generated by the acidulation process. The phosphate containing material can be any material that generates phosphoric acid upon exposure to an acid, such as phosphate containing rock. The acid can generally be any strong acid, but is preferably an acid that precipitates calcium, such as sulfuric acid. Sulfuric acid can generally be freely obtained as an unwanted byproduct from other chemical industries. Phosphate containing rock, particularly low grade rock, is generally also obtainable at a very low cost.

In step 115, the acidulated phosphate containing material, generally in the form of a slurry, is mixed with the black liquor (such to bring the pH to about 3) to cause separation of the lignin from the black liquor, wherein clarified liquor comprising anion species including phosphate is produced. Although generally not preferred, in an alternate embodiment, phosphoric acid is produced by acidulating the phosphate containing material with acid, which is then decanted and mixed with the black liquor.

In a preferred embodiment, prior to mixing the black liquor with the phosphoric acid, a water soluble, surface active, polymeric, coagulation agent is added to the black liquor. However, when the phosphate contain material is phosphate rock, particularly high surface area small rock, the rock may provide sufficient nucleation so that the efficient separation processing can proceed without the addition of a water soluble, surface active, polymeric, coagulant agent.

A solids/liquid separation step, such as using filtration, centrifugation or settling, can be used to separate the wet lignin and solids formed from the clarified liquor solution. The solid products obtained from the acidulation step can contain acidulated phosphatic material, as well as lignin. This mixture can be an ideal soil amendment product due to slowly soluble phosphate, which can be similar to single and or triple super phosphates. In addition, the organic content of lignin can act as a useful soil binder. The solid product mixture produced by step 115 is unique to the inventive process. Alternatively, the solid products can be separated as individual lignin, and sup er phosphate fertilizer components.

The method generally also includes the step of causticizing the clarified liquor (120). In a preferred embodiment, causticizing proceeds with addition of slightly soluble calcium oxide to the clarified liquor to attain a pH of about 4 to 5, generally by dissolved calcium oxide dissociating to ionized calcium hydroxide. A calcium phosphate, such as $Ca(HPO_4)_2$, is less soluble than calcium oxide at the indicated pH value. Therefore, calcium phosphate compounds selectively precipitate phosphate ions associated with sodium and potassium, leaving a resulting $Na_2HPO_4$ solution. Additional CaO is then preferably added to bring the pH to about 9 or greater. $Ca_3(PO_4)_2$ precipitates, and is then separated to leave a NaOH solution for use again in the pulping process. The inventive method thus allows use of low cost sulfuric acid and low grade phosphate containing rock to achieve the equivalent pulping chemical recovery that could only previously be achieved using high cost phosphoric acid.

Through selection of appropriate causticizing conditions, byproducts of the claimed method can include significant quantities of calcium monophosphate which can be sold as a nutrient rich soil amendment or phosphate fertilizer. Thus, using the claimed invention, alkaline pulping chemicals can be recovered at little or no net cost. In many expected applications of the invention, concurrent production of fertilizer grade phosphate and byproduct soil amendment rich in phosphate and gypsum can be a profit source for paper mills.

It is generally desirable to produce chemical forms of calcium phosphate precipitates suitable for agricultural fertilizer, such as calcium phosphates mainly in "citrate soluble" forms such as calcium monophosphate (known in the trade as superphosphate), as these have higher economic value as byproducts sold to agricultural communities. This result is achieved with pH control during the causticizing process as described below.

The main chemical reactions at different approximate pH ranges are as follows:

$$2H_3PO_4+Ca(OH)_2=Ca(H_2PO_4)_2+2H_2O \qquad \text{at pH 4–5}$$

$$4NaH_2PO_4+Ca(OH)_2=Ca(H_2PO_4)_2+2Na_2HPO_4+H_2O \qquad \text{at pH 4–5}$$

The $Ca(H_2PO_4)_2$ product is an essentially fully citrate soluble compound and is also used as fertilizer in single superphosphate and triple super phosphate form. Also, these compounds have a higher water solubility as compared to other calcium phosphates compounds.

$$3Na_2HPO_4+Ca(OH)_2=CaHPO_4+2Na_3PO_4+2H_2O \qquad \text{at pH 6–8}$$

$$2Na_3PO_4+3Ca(OH)_2=Ca_3(PO_4)_2+6NaOH \qquad \text{at pH>9}$$

Last equation can also form hydroxyapatite according to the following equation:

$$6Na_3PO_4+10Ca(OH)_2=Ca_{10}(PO_4)_6(OH)_2+18NaOH \qquad \text{at pH>9}$$

These calcium compounds formed at relatively higher pH values can be recycled and used instead of phosphate comprising material, such as phosphate rock, or transferred to super phosphate fertilizer by reaction with sulfuric acid.

By applying the economic benefits from the claimed invention for separating lignin from black liquor in soda alkali pulping followed by recovery of caustic liquor, small scale mills for wood pulping will also become more cost effective, along with small pulping operations using waste agricultural residues (straw and corn stover as examples) as well as intentionally grown fiber rich crops. Further, an alternate chemical recovery system can be applied to kraft pulping of wood in much the same manner as for soda alkali pulping. Lignin separation by the inventive process applied to kraft black liquors can lead to substantial energy savings through reduced fossil fuel needs by avoiding high energy consumption of black liquor evaporation.

In a preferred embodiment of the invention, lignin and other non-cellulose materials from the cellulose fiber source is efficiently and rapidly separated from black liquor by water soluble, surface active, polymeric agent treatment followed by lowering pH of the liquor to below pH 3 with strong acid as taught in U.S. Pat. No. 6,632,327 to El-Shall. The water soluble, surface active, polymeric agent, sometimes referred to hereinafter as "polymer", to the spent, waste, alkaline digestion liquor before or during the acidification of such digestion liquor is applicable to the spent, waste digestion liquors from both the commonly used kraft sulfate process and the soda process, whether or not diluted and without the use of heat or pressure.

The polymers generally have molecular weights ranging from about five million to about twenty-five million, and may be anionic polymers, such as copolymers of acrylamide and acrylic acid (or sodium acrylate), or partially hydrolyzed polyacrylamide and homopolymers or copolymers of sulfonic acid and acrylamide, which are available as commercial products, such as Percol 919 and Percol 156 from Ciba Specialty Chemicals (successor to Allied Colloids, Inc), Perth Western Australia, and Nalco 7877 from NALCO Chemicals Company, India. On the other hand, they may be nonionic polymers based on polyacrylamide chemistry or polyethylene oxides, such as Percol 351, Percol 802, and PEO (polyethylene oxide) available from Ciba Specialty Chemicals; or may be cationic polymers of different charge densities, such as Percol 368, Percol 292, and Percol 2802. Nonionic polymers are generally preferred.

The polymer or a mixture of polymers are generally added in an amount to bring concentration thereof to within the range of about 0.05% to about 1.0% by weight in the liquor. To achieve such percentage range, the polymer or mixture of polymers is added in amount from about 0.1 to about 5.0 pounds/ton of dry organic material in the digestion liquor. The preferred level of addition is about one pound per ton.

The strong acid treatment provided by the acidulated phosphate rock results in the original sodium and potassium alkali species in pulping liquor becoming salts of the strong acid. Although sulfuric acid is a preferred source of acidity because of its being low in cost as described in U.S. Pat. No. 6,632,327 to El-Shall, sodium and potassium sulfate resulting from sulfuric acid treatment is not amenable to burnt lime (CaO) causticizing for recovery and return of caustic from clarified liquor because calcium sulfate has higher solubility than calcium oxide. Thus, calcium sulfate does not precipitate when the alkali sulfate solution is treated with burnt lime.

Using phosphoric acid as the strong acid instead of sulfuric acid according to the invention, causticizing becomes successful as calcium phosphate is less soluble than calcium oxide. However, use of phosphoric acid is not economically feasible because of its relatively high in cost as compared to sulfuric acid. Even if precipitated calcium phosphate is collected and sold as fertilizer byproduct, use of phosphoric acid for black liquor treatment generally remains economically unattractive. However, the use of low cost phosphate rock as the source of phosphoric acid through application of sulfuric acid acidulation renders use of phosphoric acid in the recovery process as an economically viable process.

An exemplary application of the invention is now described. The inventive process for treatment of black liquor for recovery of white liquor to be reused is generally carried out in three stages. The initial stage in most applications is treatment of the liquor by a biological process to eliminate soluble organic content of the liquor giving rise to biological oxygen demand ("B.O.D."). The preferred method of biological treatment is anaerobic digestion, commonly termed biomethanation, which has the benefit of making fuel gas from organic matter. Anaerobic digestion is carried out by applying an appropriate type of methanogenic bacteria that has been adapted for black liquor treatment. Low B.O.D. liquor effluent from biological treatment containing lignin and pulping chemicals can be further processed by aerobic digestion if additional B.O.D. reduction is necessary. Black liquor is thereby prepared for continuation into the second stage of treatment.

Alternatively, biological treatment can be performed after lignin separation is completed if sulfate chemicals comprise only a small fraction of dissolved solids in alkali pulping liquor. This is the case when the inventive process which utilizes phosphoric acid is employed. A further variant in the black liquor treatment process is treatment of clarified liquor containing soluble organic matter derived by alkali pulping of fibrous agricultural species by enzymatic conversion of the organic solubles to ethanol, wherein the enzymatic treatment is conducted on clarified liquor from which lignin has previously been separated according to the inventive process. In both such cases, lignin separation becomes the first stage of the process and anaerobic digestion or the ethanol conversion process performed on clarified (delignified) liquor is the second stage of black liquor treatment. It is necessary to process resultant liquor product following enzymatic conversion for separation of ethanol, usually by distillation, and thereafter treat final liquor by aerobic digestion in order that B.O.D. levels of final treated liquor are brought to acceptable values.

The second stage of black liquor treatment according to the usual application of the inventive process after first stage biotreatment is lignin separation induced by injection of acidulated low grade phosphate rock into the black liquor. In a preferred embodiment, the phosphate rock previously is slurried with an appropriate quantity of sulfuric acid after which acidulation is allowed to proceed to effective completion.

Black liquor treated with the polymers described herein as well as those described in U.S. Pat. No. 6,632,327 to El-Shall is preferably mixed with the acidulated phosphate rock slurry. Rapid separation of lignin is accomplished during mixing with the phosphoric acid in rock and gypsum slurry produced by acidulation, aided through mechanical agitation as necessary to expedite the process while controlling to specified pH. Solids comprised of gypsum (phosphogypsum), lignin precipitate, and residuals from the original phosphate rock are dewatered as needed and then transported for distribution as organic mineral rich soil amendment after being separated from clarified liquor using filters or centrifugal machines.

As variant of this process stage when lignin is to be separated without its being mixed with inorganic mineral solids, the acidulated rock slurry can be filtered or decanted after settlement of solids to produce an essentially suspended solids free liquid phase comprising phosphoric acid solution for precipitating lignin from black liquor. This process variant is employed when separated lignin is to be collected and prepared for use as combustible fuel for steam or power production, for example. Clarified liquor after lignin separation composed mainly of an acidic sodium and potassium phosphate solution is submitted to the final stage of causticizing at completion of the second process stage.

Liquid used for slurry of low grade phosphate rock for acidulation can be clarified liquor (weakly acidic phosphate solution from above solids separation stage) rather than introducing fresh water to the process, thereby minimizing dilution which otherwise can require evaporation to maintain an equilibrium balance of water in the process.

In the third and final stage of treatment generally utilized, burnt lime (calcium oxide) is added to the clarified solution to permit recovery of white liquor by causticizing. Burnt lime feeding is conducted at a controlled rate such that pH is held to a proper value as determined by suitable measuring devices for producing high citrate soluble fertilizer as calcium phosphate precipitate. The causticizing process is essentially the same as that used for alkali carbonate in the kraft pulping industry except that calcium phosphate is precipitated rather than calcium carbonate. The process of burnt lime treatment continues until the required alkalinity for pulping liquor is attained, which occurs typically with about ninety percent conversion to caustic in the conventional calcium carbonate process. With phosphate precipitation a higher level of conversion (and thereby lower phosphate content of white liquor) may be desirable to minimize phosphate anion content of white liquor recirculated to pulping digestors.

Calcium phosphate precipitate as byproduct from causticizing may be separated and sold as phosphate fertilizer if the quality is sufficiently high. Alternatively, the calcium phosphate precipitate can be returned to the soil amendment byproduct from the second process stage.

The process of three stage black liquor treatment can be carried out in batch mode or in continuous mode, in its entirety or in parts, according to the most efficient manner of conducting the process under circumstances encountered in its particular application.

EXAMPLES

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof.

The following experimental conditions were used relative to Example 1 (sulfuric acid reacted with phosphate rock before addition to black liquor) and Example 2 (sulfuric acid and phosphate rock are added simultaneously to black liquor):

Conditions and Amount of Reactants
Basis: 100 ml Concentrated Black Liquor

| Conditions and Amounts | Example 1 Sulfuric Acid Reacted with Phosphate Rock before Addition to Black Liquor | Example 2 Sulfuric Acid and Phosphate Rock are added Simultaneously to Black Liquor |
|---|---|---|
| Temperature, °C. | Ambient | Ambient |
| Retention Time, hr | 3 | 3 |
| Final pH after CaO Addition | 8.9 | 9.2 |
| Amount of Sulfuric Acid, ml | 15 | 15 |
| Concentration of $H_2SO_4$, % | 98 | 98 |
| Amount of Phosphate Rock, g | 35 | 35 |
| $P_2O_5$ in Phosphate Rock, % | 29.5 | 29.5 |
| Phosphate Rock Particle Size | 100%–200 mesh | 100%–200 mesh |
| Volume of Polymer Solution, ml | 40 | 40 |
| Concentration of polymer, % | 0.05 | 0.05 |
| Volume of Water, ml | 200 | 200 |
| Amount of CaO, g | 12 | 12 |

Example 1

In this Example, the polymeric, coagulant agent solution was first added to the black liquor. As noted above, sulfuric acid was reacted with phosphate containing rock before addition to the polymer intermixed with the black liquor. Below are the results obtained from the chemical analysis performed. The spent liquor shows lower concentrations as compared to the black liquor due to dilution by water and polymer solution.

| Impurity Content, % | Black Liquor | Spent Liquor | NaOH Soln. | Calcium Phosphate |
|---|---|---|---|---|
| $Na_2O$ | 4.80 | 1.21 | 1.12 | 1.14 |
| $P_2O_5$ | 0.07 | 3.28 | 0.33 | 39.4 |
| CaO | 0.06 | 0.48 | 0.002 | 35.9 |
| $SO_4$ | 0.55 | 0.65 | 0.53 | 0.54 |

Example 2

In this Example, the polymeric, coagulant agent solution was again first added to the black liquor as described above. As noted above, sulfuric acid and phosphate rock were added simultaneously to the polymer intermixed with the black liquor. A chemical analysis of black liquor, and other streams after lignin separation using the invention provided the following results:

| Impurity Content, % | Black Liquor | Spent Liquor | NaOH Soln. | Calcium Phosphate |
|---|---|---|---|---|
| $Na_2O$ | 4.80 | 1.57 | 1.52 | 1.25 |
| $P_2O_5$ | 0.07 | 3.92 | 0.23 | 40.1 |
| CaO | 0.06 | 0.28 | 0.003 | 36.3 |
| $SO_4$ | 0.55 | 0.39 | 0.31 | 0.29 |

Both Examples described above included a separation process including a water soluble, surface active, polymeric, coagulant agent first added to the black liquor prior to phosphoric acid treatment. However, as noted above, when the phosphate contain material is high surface phosphate rock, the rock may provide sufficient nucleation so that the efficient separation processing can proceed without the addition of the polymeric, coagulant agent.

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof.

We claim:

1. A method of treating spent alkaline pulping liquor (black liquor), comprising the steps of:

providing black liquor having lignin therein;

contacting phosphate comprising rock with an acid solution, wherein an acidulated phosphate rock slurry including phosphoric acid is generated;

mixing said black liquor with phosphoric acid from said acidulated phosphate rock slurry to cause separation of said lignin from said black liquor, wherein clarified liquor comprising anion species including phosphate is produced, and causticizing said clarified liquor after said mixing step using a material comprising calcium oxide, wherein caustic soda and a precipitate including at least one calcium phosphate comprising specie is produced.

2. The method of claim 1, wherein said acid solution is a sulfuric acid solution.

3. The method of claim 2, further comprising the step of filtering said acidulated phosphate rock slurry to form a solid-free liquid phase comprising said phosphoric acid, said filtering step prior to said mixing step.

4. The method of claim 2, wherein said mixing step is performed in the presence of said phosphate comprising rock.

5. The method of claim 1, wherein an amount of said acid solution used in said contacting step is less than the amount necessary for complete conversion of said phosphate rock to said phosphoric acid.

6. The method of claim 1, wherein said method includes the step of adding a water soluble, surface active, polymeric, coagulant agent to said black liquor.

7. The method of claim 6, wherein said adding step precedes said mixing step.

8. The method of claim 7, wherein a surface active agent coactive with said polymeric, coagulant agent, is added to said black liquor prior to the said mixing step.

9. The method of claim 1, wherein said calcium phosphate comprising species includes $Ca(H_2PO_4)_2$.

10. The method of claim 1, wherein said calcium phosphate comprising species includes at least one selected from the group consisting of $CaHPO_4$, and $Ca_{10}(PO_4)_6(OH)_2$.

11. The method of claim 1, wherein said black liquor is obtained from a kraft process pulping plant.

12. The method of claim 1, wherein said black liquor is obtained from a soda process pulping plant.

13. The method of claim 1, wherein said phosphate comprising rock comprises low grade phosphate.

14. The method of claim 13, wherein a weight percentage of $P_2O_5$ in said low grade phosphate comprising rock is about 29.5%.

* * * * *